United States Patent [19]
Antoni et al.

[11] Patent Number: 6,069,410
[45] Date of Patent: May 30, 2000

[54] ANTI-TAMPERING METHOD AND CORRESPONDING CIRCUITS AND ELECTRIC SYSTEMS

[75] Inventors: Giovanni Degli Antoni, Segrate; Roberto Bisiani, Milan; Bruno Murari, Monza Milano, all of Italy

[73] Assignee: SGS-Thomson Microelectronics S.R.L., Agrate Brianza, Italy

[21] Appl. No.: 08/538,154

[22] Filed: Oct. 2, 1995

[30] Foreign Application Priority Data

Sep. 30, 1994 [EP] European Pat. Off. .............. 94830467

[51] Int. Cl.$^7$ .................................................. B60R 25/04
[52] U.S. Cl. .................... 307/10.2; 180/287; 340/825.72
[58] Field of Search ................... 307/10.1–10.6; 180/287; 340/425.5, 426, 825.3–825.32, 825.34, 825.44, 825.54, 825.69, 825.72

[56] References Cited

U.S. PATENT DOCUMENTS

| | | | |
|---|---|---|---|
| 4,749,873 | 6/1988 | Mutoh et al. | 307/10.2 |
| 5,229,648 | 7/1993 | Sues et al. | 307/10.2 |
| 5,473,200 | 12/1995 | Woo | 307/10.2 |
| 5,644,172 | 7/1997 | Hodges | 307/10.5 |

FOREIGN PATENT DOCUMENTS

| | | |
|---|---|---|
| 0 614 791 | 9/1994 | European Pat. Off. . |
| 2 613 993 | 10/1988 | France . |
| 36 13 605 | 11/1987 | Germany . |
| 93 23270 | 11/1993 | WIPO . |

*Primary Examiner*—Richard T. Elms
*Attorney, Agent, or Firm*—Theodore E. Galanthay; Allen, Dyer, Doppelt, Milbrath & Gilchrist, P.A.

[57] ABSTRACT

An anti-tampering circuit for a vehicle includes an operational circuit providing a predetermined function for the vehicle to be protected, and a control circuit connected to the operational circuit for enabling and disabling operation thereof. The control circuit includes a semiconductor substrate, a communications circuit formed on the semiconductor substrate receiving data corresponding to an identification code from at least one external source within the vehicle, and a non-volatile memory formed on the semiconductor substrate and connected to the communications circuit for storing only once a predetermined identification code. The communications circuit writes the received data to the non-volatile memory as the predetermined identification code when the control circuit is within the vehicle if the predetermined identification code has not already been stored therein. The control circuit further includes a comparator formed on the substrate for comparing the received data with the predetermined identification code and providing a comparison signal. A selector is also formed on the substrate for enabling and disabling the operational circuit responsive to the comparison signal.

19 Claims, 3 Drawing Sheets

ANTI-TAMPERING METHOD AND CORRESPONDING CIRCUITS AND ELECTRIC SYSTEMS

CROSS-REFERENCE TO RELATED APPLICATION

This application claims priority from EPC App'n 94830467.0, filed Sep. 30, 1994, which is hereby incorporated by reference. However, the content of the present application is not necessarily identical to that of the priority application.

BACKGROUND AND SUMMARY OF THE INVENTION

The present invention relates to a method of ensuring against tampering in an electrical system which consists of intercommunicating electrical devices, and also to electrical circuits and systems capable of implementing this method (and thus gaining protection against theft or tampering).

A large number of machines commonly used in daily life contain electrical systems of the above mentioned type which allow correct operation of such apparatuses. Automotive vehicles are one important example.

An electrical system for command and control of electrical devices in an automotive vehicle which has a main central control unit in communication therewith is known from patent application PCT WO 90/10559 for example, which is hereby incorporated by reference. Such electrical devices comprise at least one electrical operation member and an electronic block for command and control.

It is clear that tampering with the electrical system could result in great damage to the equipment and/or its users.

A method for ensuring an integrated circuit against unauthorized use and/or copying is known from U.S. Pat. No. 4,766,516, which is hereby incorporated by reference. In accordance with that document, an integrated circuit designed to provide a particular circuit function has at least one additional circuit element not contributing to performance of these circuit function.

This circuit element assumes the form of a subcircuit for control codes and inhibits operation of the remaining part of the integrated circuit unless it is addressed by means of its control code. The control code subcircuit is at least partially formed of a Focused Ion Beam (FIB) or equivalent rays. Part of the control code subcircuit elements can then be formed with apparent functions which are different from their real functions by using again, for example, a FIB.

This method is thus based on the idea of camouflaging the control code in such a manner that copies, if any, could not be used. The techniques for achieving this can all be applied only during production and in any case before assembly and also require very sophisticated equipment.

The purpose of the present invention is to provide a simple and economical way to implement anti-tampering method for electrical systems.

This purpose is achieved through the anti-tampering method which, through sending and/or reception of identification codes, at least one of the devices in an electrical system is capable of checking whether the system has been tampered with and disables at least its own operation, and preferably the operation of the system.

In terms of the devices employed, the purpose is achieved through the addition to a circuit of a control section which does not contribute to the circuit function, but which is designed to enable and disable operation of the circuit. The control section will have a means of communication which is designed to receive identification codes from at least one external transmitter, a memory to memorize the given identification codes, a comparator designed to compare the codes received with the memorized codes and to emit a result signal corresponding to the result of the comparison, and a selector which enables and disables operation of the circuit depending on the result signal. This circuit and control section may be integrated circuits, but this is not necessary.

An electrical system designed according to this invention is particularly useful in vehicles, where a circuit as described above would automatically check identification codes of the electrical system as soon as the system is switched on.

In an electrical system comprising a plurality of electrical devices, the devices are identified by identification codes memorized in respective control sections and interconnected by means of at least one transmission means. By means of sending and/or reception of the identification codes at least one of the devices is capable of checking whether the system has been tampered with and that at least one said device (preferably all) disables its own operation, the user of the system will be immediately alerted.

By memorizing the identification codes in non-volatile memories programmed only once, customization of the control devices is extremely simple to provide after production of the circuit and executable by means of simple electrical circuits.

Even if the identification code is not camouflaged, the need to replace all the control sections for full operation of the electrical system is in itself a sufficient deterrent against tampering.

Such a method lends itself to use as an anti-theft device, for example for vehicles. Indeed, normally in a vehicle there is a central unit which, after execution of an identification procedure (insertion of the correct key for example), permits starting of the vehicle and checking of the electrical devices connected thereto. The thief is thus forced to disconnect and then replace the central unit with another one. Of course if the electrical devices can be activated only by the central unit associated therewith, e.g. by means of the same identification code, it will be necessary to replace the electrical devices subsequently. This can be considered a good deterrent due to the necessary cost and time.

Thus, in accordance with another aspect, the present invention also relates to an anti-theft method which utilizes the anti-tampering method above to prevent theft of a vehicle. It also relates to a vehicle ensured against theft which has an electrical system capable of implementing such a method.

BRIEF DESCRIPTION OF THE DRAWING

The disclosed inventions will be described with reference to the accompanying drawings, which show important sample embodiments of the invention and which are incorporated in the specification hereof by reference, wherein.

The invention is clarified by the description given below considered together with the annexed drawings wherein.

DETAILED DESCRIPTION OF THE PREFERRED EMBODIMENTS

Figure 2:
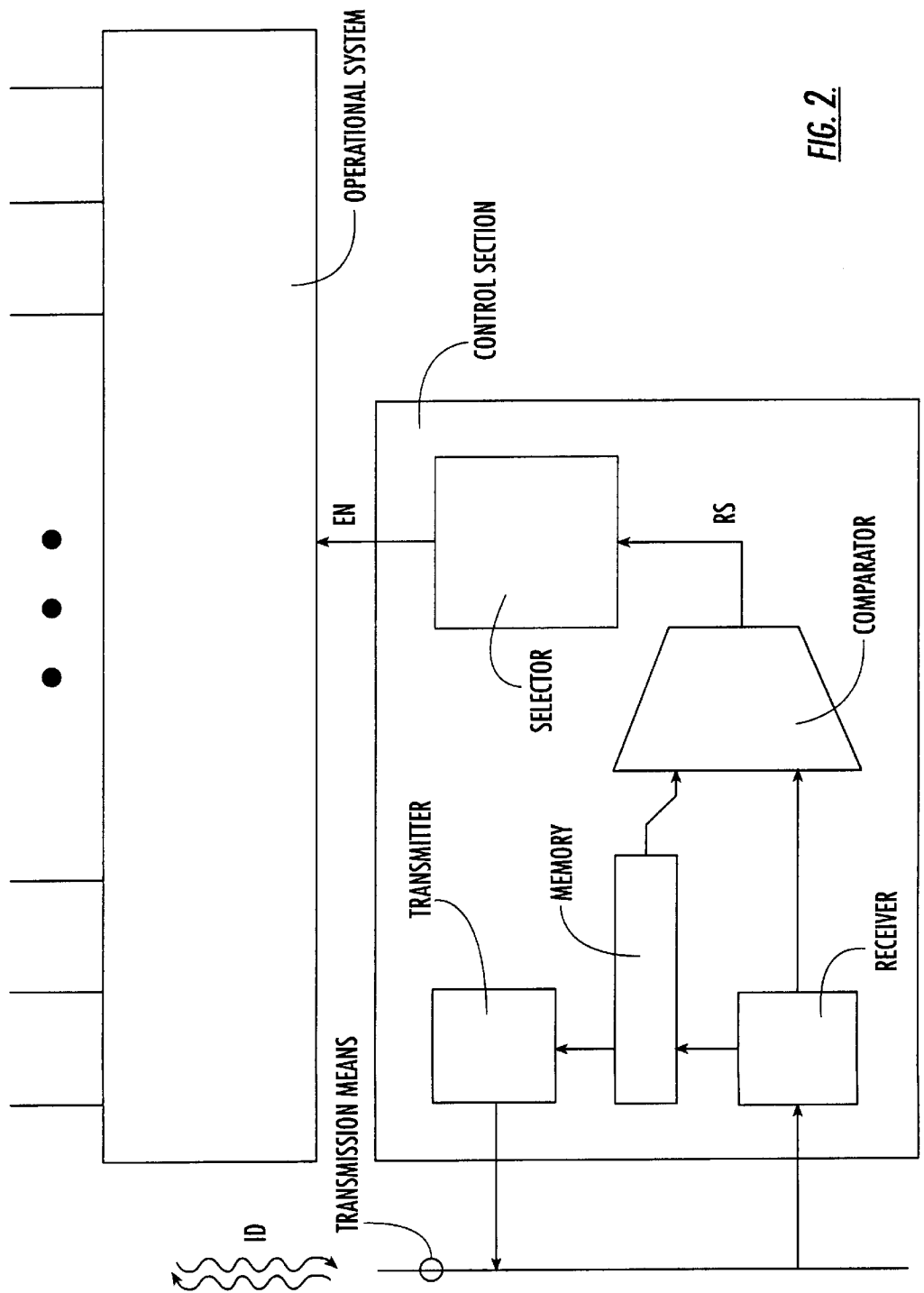
FIG. 2 shows the block diagram of an electrical circuit in accordance with the present invention.

The numerous innovative teachings of the present application will be described with particular reference to the presently preferred embodiment (by way of example, and not of limitation), in which:

With reference to FIG. 2, an electrical circuit in accordance with the present invention is identified by an identification code ID and comprises at least the following:

a) an operational section OS designed to provide a predetermined circuit function, and
b) a control section CS non contributing to provision of the predetermined circuit function and connected to the operational section OS and designed to enable and disable operation thereof.

The control section CS comprises the following:

c) communication means and specifically a receiver RX designed to receive data corresponding to identification codes from at least one transmission means TM outside the circuit,
d) non-volatile memory means MEM designed to memorize the identification code ID,
e) comparison means CP designed to compare the data with the identification code ID and to emit a result signal RS corresponding to the result of the comparison, and
f) selection means SM designed to enable and disable operation of the operational section OS on the basis of the result signal RS.

The memory means MEM can be provided by means of a PROM or EPROM memory. In this case memorization of the identification code must be done "off-line."

Alternatively the memory means MEM can be the type electrically programmable only once and the receiver RX is then connected directly to the memory means MEM and is furthermore suitable for writing an identification code received in the memory means MEM if they do not already contain one.

The communication means and in particular a transmitter TX can be connected directly to the memory means MEM and can then be furthermore suitable, after switching-on the circuit, to transmit on at least one transmission means outside the circuit, e.g. the means TM, the content of the memory means MEM if they were programmed previously.

In the circuit in accordance with the present invention the comparison means CP in combination with the selection means SM can be such as to keep disabled operation of the operational section OS after switching-on the circuit and at least until reception of the data, e.g. by the means TM.

It is particularly advantageous that the electrical circuit be integrated in a chip to ensure greater safety in addition of course to smaller space occupation.

Such an electrical circuit is the basic block to be able to implement the method and provide the electrical system in accordance with the present invention.

Figure 1:
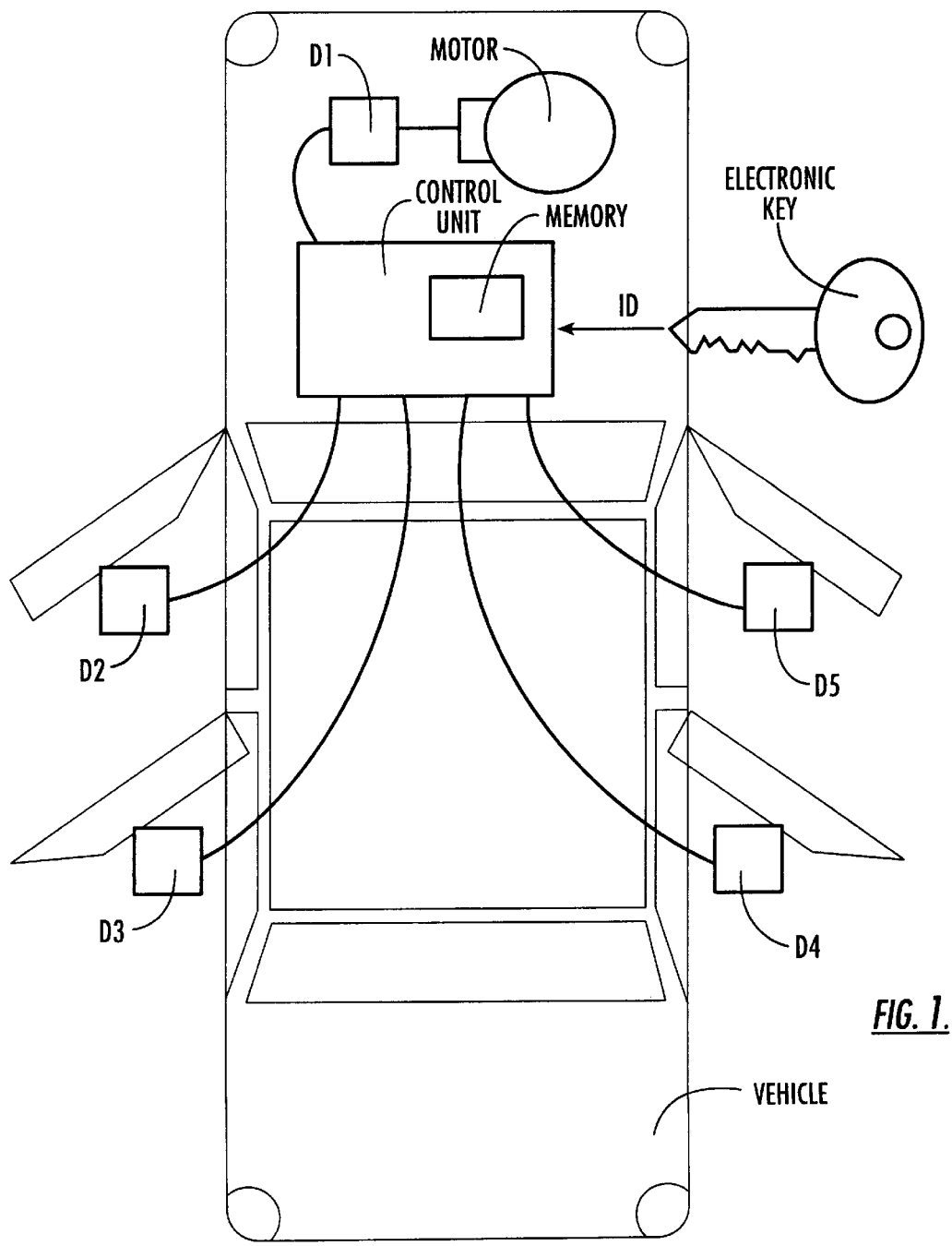
FIG. 1 shows the block diagram of an electrical system in accordance with the present invention applied to an automotive vehicle.

With reference to FIG. 1 an electrical system in accordance with the present invention and in particular for an automotive vehicle, V comprises a plurality of electrical devices D1–D5 designed to perform predetermined operations and at least one central unit CU in communication with the electrical devices D1–D5 and designed to permit performance of the operations after execution of an identification procedure.

The central unit CU is associated with non-volatile memory means designed to contain at least one identification code ID and transmission means designed to transmit after switching-on the electrical system to the electrical devices D1–D5 at least one identification code ID and the electrical devices D1–D5 comprise an electrical circuit like the one described above.

In FIG. 1 the devices D2–D5 control e.g. closing of the doors of the automotive vehicle V and the respective window raisers and the device D1 controls the motor MO.

The electrical devices can be connected to the central unit CU by means of one or more busses in order to use a smaller number of wires and facilitate wiring of the automotive vehicle.

There are virtually two alternative possibilities for provision of the memory means MEM.

This memory means can comprise an internal non-volatile semiconductor memory device MEM inserted in the central unit CU and designed to contain at least one identification code ID.

Alternatively the memory means comprise an external identification device K, e.g. an electronic key. In this case the central unit CU must comprise reading means designed to read at least one identification code ID from the external device K.

If the memory means comprise both the internal device MEM and the external device K the central unit CU can comprise comparison means designed to compare at least one identification code read from the device K with at least one identification code contained in the device MEM.

It can be foreseen that the central unit CU would comprise reception means designed to receive from the electrical devices D1–D5 the identification code memorized in the corresponding memory means and compare them correspondingly with that contained in the memory means associated with the unit.

A simply way of providing, at least partially, the central unit CU would be to use an electrical circuit like that discussed above. Using the electrical circuit and the electrical system discussed, implementation of the method in accordance with the present invention is immediate.

This method consists of providing that, by sending and/or reception of the identification codes, at least one of the electrical devices would be capable of verifying whether the system has been tampered with. This works on the assumption that, because of a tampering event, there is either a device missing from the electrical system or a device has been replaced with another one and the identification code of the latter is wrong.

This can be done in various ways which may also depend on the manner in which the electrical devices are connected together and/or in communication. In case of physical or logical loop connection each device could check the presence and correct identification of the device preceding it, expecting that the latter would send it its identification code. In case of star connection, the device placed in the center, which could also be a central unit, could check the presence and correct identification of the other devices expecting that they would send their identification code.

The device detecting the tampering event disables its own operation or even that of the others.

This device can also inform the other devices which then individually disable their own operation.

In a particularly convenient and simple embodiment for being applied in automotive vehicle electrical systems, the electrical system comprises a central unit which, after execution of an identification procedure (e.g. insertion of the ignition key), sends to all the devices the identification codes which can for example be all the same. The devices then check that the code received corresponds to that memorized in their control section and, if it does not, disable their own operation.

In case of replacement of an electrical device or at least its control section, e.g., for a failure, it is necessary that in the new control section there be inserted the correct identification code. This can be done "off-line" before the replacement by programming the non-volatile memory means MEM. It can also be provided that it is the control section which will memorize in its memory means MEM the first identification code received by the receiver RX.

As already amply discussed, the method in accordance with the present invention lends itself to being used as an anti-theft device for vehicles such as automobiles, lorries, busses, boats, airplanes, etc.

Furthermore, the electrical system in accordance with the present invention lends itself to being used as the electrical system of a vehicle, which is ensured against theft if the system provides the method in accordance with the present invention.

Figure 3:
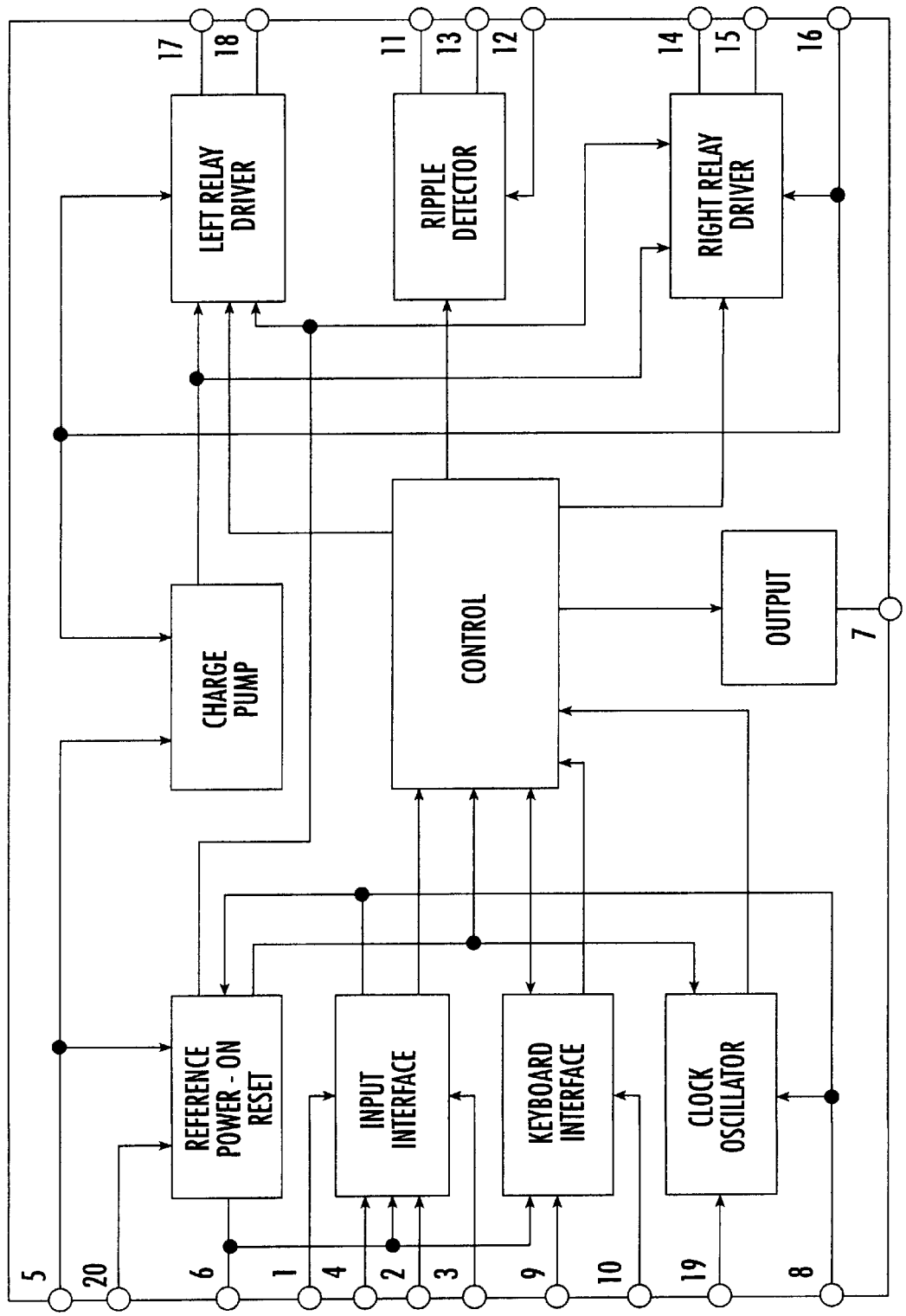
FIG. 3 shows one example of an existing ASIC into which the circuitry of FIG. 2 can advantageously be inserted.

The disclosed innovations can of course be included in different components of an automobile system in different ways. FIG. 3 shows one example of an existing ASIC into which the circuitry of FIG. 2 can advantageously be inserted. The specific example shown is an L9324 Window Lift Controller chip, but of course the innovative circuitry can be included in many other chips and modules.

The Appendix provides data sheets for two examples of existing ASICs in which the disclosed protection circuitry can advantageously be incorporated. The two specific examples provided are an L9324 Window Lift Controller, and an L9686 Automotive Direction Indicator (both SGS-Thomson parts). (Both of these chips, and their data sheets, are hereby incorporated by reference.) However, these are only two examples; as more advanced automotive designs use data bus interfaces and smart power integrated circuits, there may be dozens of such integrated circuits in a single car.

According to a disclosed class of innovative embodiments, there is provided: Electric circuit identified by an identification code comprising at least the following: a) an operational section designed to provide a predetermined circuit function, and b) a control section non contributing to provision of the predetermined circuit function and connected to said operational section and designed to enable and disable operation thereof, and characterized in that said control section comprises: c) communication means designed to receive data corresponding to identification codes from at least one external transmission means, d) non-volatile memory means designed to memorize said identification code, e) comparison means designed to compare said data with the identification code and to emit a result signal corresponding to the result of the comparison, and f) selection means designed to enable and disable operation of the operational section OS depending on the result signal.

According to another disclosed class of innovative embodiments, there is provided: Electrical system, in particular for vehicles, of the type comprising a plurality of electrical devices designed to perform predetermined operations and at least one central unit in communication with said electrical devices and designed to permit completion of said operations after execution of an identification procedure and characterized in that said central unit is associated with non-volatile memory means designed to contain at least one identification code and transmission means designed to transmit after switching-on the electrical system to said electrical devices said at least one identification code and in which said electrical devices comprise an electrical circuit as described above.

According to another disclosed class of innovative embodiments, there is provided: Method of ensuring against tampering an electrical system comprising a plurality of electrical devices identified by identification codes memorized in respective control sections and interconnected by means of at least one transmission means and characterized in that by means of sending and/or reception of said identification codes at least one of said devices is capable of checking whether the system has been tampered with and disables at least its own operation.

According to another disclosed class of innovative embodiments, there is provided: A circuit provided with anti-tampering capabilities, comprising: a plurality of devices connected to said circuit; a non-volatile memory containing memorized identification codes; a comparator connected to received transmitted identification codes from said plurality of devices and to compare said transmitted identification codes with said memorized identification codes; a switch which receives the output of said comparator and which disables operation of at least one of said plurality of devices when said transmitted identification codes do not match said memorized identification codes.

According to another disclosed class of innovative embodiments, there is provided: A circuit provided with anti-tampering capabilities, comprising a plurality of devices connected to said circuit, wherein at least one of said plurality of devices comprises: a non-volatile memory containing a memorized identification code; a comparator connected to received a transmitted identification code from another of said plurality of devices and to compare said transmitted identification code with said memorized identification code; a switch which receives the output of said comparator and which disables operation of at least its respective device when said transmitted identification code does not match said memorized identification code.

According to another disclosed class of innovative embodiments, there is provided: A method for preventing tampering in an electrical system, comprising, whenever the system is turned on, the following steps: a) receiving a transmitted identification code from respective ones of a plurality of devices connected to said electrical system; b) comparing said transmitted identification code with at least one memorized identification code; c) disabling at least one of said devices whenever a transmitted code does not match one of said memorized identification codes.

As will be recognized by those skilled in the art, the innovative concepts described in the present application can be modified and varied over a tremendous range of applications, and accordingly the scope of patented subject matter is not limited by any of the specific exemplary teachings given. For example, as will be obvious to those of ordinary skill in the art, other circuit elements can be added to, or substituted into, the specific circuit topologies shown.

What is claimed is:

1. An anti-tampering circuit for a vehicle comprising:
   a central control unit within the vehicle to be protected;
   a plurality of operational circuits positioned throughout the vehicle providing a predetermined function;
   a plurality of control devices, each control device being connected to one of said plurality of operational circuits and to said central control unit for enabling and disabling operation of said respective operational circuit, each control device comprising
   a semiconductor substrate,
   a communications circuit formed on said semiconductor substrate for receiving data corresponding to an identification code from said central control unit,
   a non-volatile memory formed on said semiconductor substrate and connected to said communications circuit for storing only once a predetermined identification code, said communications circuit writing the received data to said non-volatile memory as the predetermined identification code when said control device is within the vehicle if the predetermined identification code has not already been stored therein, a comparator formed on said substrate for comparing the received data with the predetermined identification code and providing a comparison signal, and a selector formed on said substrate for enabling and disabling said respective operational circuit responsive to the comparison signal.

2. An anti-tampering circuit according to claim 1, wherein said non-volatile memory comprises a programmable read only memory (PROM).

3. An anti-tampering circuit according to claim 1, wherein said communications circuit transmits the predetermined identification code stored in said non-volatile memory to said central control unit after the anti-tampering circuit has been powered on.

4. An anti-tampering circuit according to claim 1, wherein said selector disables said respective operational circuit after the anti-tampering circuit has been powered on until the data corresponding to the identification code has been received and verified.

5. An anti-tampering circuit according to claim 1, wherein said central control unit comprises:
a semiconductor substrate;
a non-volatile memory formed on said semiconductor substrate for storing only once the predetermined identification code;
a communications circuit formed on said semiconductor substrate for transmitting the data corresponding to the predetermined identification code to said plurality of control devices;
a comparator formed on said substrate for comparing received data provided by said plurality of control devices with the predetermined identification code and providing a comparison signal; and
a selector formed on said substrate for enabling and disabling said plurality of operational circuits responsive to the comparison signal.

6. An anti-tampering circuit according to claim 2, wherein said comparator further comprises an input receiving an external identification code from an external source, and said comparator compares the external identification code with the predetermined identification code stored in said non-volatile memory prior to transmitting the data corresponding to the predetermined identification code.

7. An anti-tampering circuit according to claim 6, wherein the external source comprises an electronic key.

8. An anti-tampering circuit for a vehicle comprising:
a plurality of operational circuits positioned throughout the vehicle to be protected for providing a predetermined function;
a plurality of control devices, each control device being connected to one of said plurality of operational circuits for enabling and disabling operation thereof, each control device comprising
a communications circuit receiving data corresponding to an identification code from at least one external source within the vehicle,
a non-volatile memory connected to said communications circuit for storing only once a predetermined identification code, said communications circuit writing the received data to said non-volatile memory as the predetermined identification code when said control device is within the vehicle if the predetermined identification code has not already been stored therein, a comparator for comparing the received data with the predetermined identification code and providing a comparison signal, and a selector for enabling and disabling said respective operational circuit responsive to the comparison signal.

9. An anti-tampering circuit according to claim 8, wherein said non-volatile memory comprises a programmable read only memory (PROM).

10. An anti-tampering circuit according to claim 8, wherein said communications circuit transmits the predetermined identification code stored in said non-volatile memory to said at least one external source until after the anti-tampering circuit has been powered on.

11. An anti-tampering circuit according to claim 8, wherein said selector disables said respective operational circuit after the anti-tampering circuit has been powered on until the data corresponding to the identification code has been received and verified.

12. An anti-tampering circuit according to claim 8, wherein each control device further comprises a semiconductor substrate, and wherein said communications circuit, said non-volatile memory, said comparator and said selector are formed on said substrate defining an integrated circuit.

13. An anti-tampering circuit according to claim 8, wherein said at least one external source comprises:
a non-volatile memory for storing only once the predetermined identification code;
a communications circuit for transmitting the data corresponding to the predetermined identification code to said plurality of control devices;
a comparator for comparing received data provided by said plurality of control devices with the predetermined identification code and providing a comparison signal; and
a selector formed on said substrate for enabling and disabling said plurality of operational circuits responsive to the comparison signal.

14. An anti-tampering circuit according to claim 13, wherein said comparator further comprises an input receiving an external identification code from an external source, and said comparator compares the external identification code with the predetermined identification code stored in said non-volatile memory.

15. An anti-tampering circuit according to claim 14, wherein the external source comprises an electronic key.

16. A method for preventing tampering with a vehicle, the method comprising the steps of:
transmitting from a central control unit within the vehicle to be protected data corresponding to an identification code;
receiving at a plurality of control devices the data corresponding to the identification code;
comparing for each control device the received data with the predetermined identification code stored in a non-volatile memory and providing a comparison signal;
writing the received data to the non-volatile memory as the predetermined identification code when the respective control device is positioned within the vehicle if the predetermined identification code has not already been stored in the non-volatile memory, the predetermined identification code being stored only once in each non-volatile memory; and enabling and disabling a respective operational circuit connected to each control device responsive to the comparison signal.

17. A method according to claim 16, wherein the non-volatile memory comprises a programmable read only memory (PROM).

18. A method according to claim 16, wherein the step of transmitting is inhibited until after the central control unit has been powered on.

19. A method according to claim 16, wherein the step of enabling and disabling comprises disabling each operational circuit after the central control unit has been powered on until the data corresponding to the identification code has been received and verified.

* * * * *

UNITED STATES PATENT AND TRADEMARK OFFICE
CERTIFICATE OF CORRECTION

PATENT NO. : 6,069,410  
DATED : May 30, 2000  
INVENTOR(S) : Giovanni Degli Antoni, Roberto Bisiani, Bruno Murari Page 1 of 1

It is certified that error appears in the above-identified patent and that said Letters Patent is hereby corrected as shown below:

Title page,
Item [75], Inventors, strike "Roberto Bisiani, Milan insert -- Roberto Bisiani, Milano --

Column 1,
Line 40, strike "function" insert -- functions --
Line 57, strike "method" insert -- methods --

Column 7,
Line 44, strike "claim 2" insert -- claim 5 --

Signed and Sealed this

First Day of January, 2002

Attest:

JAMES E. ROGAN
Attesting Officer  Director of the United States Patent and Trademark Office